United States Patent [19]
Kuroda et al.

[11] Patent Number: 5,390,537
[45] Date of Patent: Feb. 21, 1995

[54] COMBUSTION STATE-DETECTING SYSTEM FOR INTERNAL COMBUSTION ENGINES

[75] Inventors: Shigetaka Kuroda; Kenichi Maeda; Kazutomo Sawamura; Hiroshi Maruyama, all of Wako, Japan

[73] Assignee: Honda Giken Kogyo Kabushiki Kaisha, Tokyo, Japan

[21] Appl. No.: 149,913

[22] Filed: Nov. 10, 1993

[30] Foreign Application Priority Data

Nov. 11, 1992 [JP] Japan .................. 4-325929

[51] Int. Cl.$^6$ ............................................. G01M 15/00
[52] U.S. Cl. ..................................................... 73/117.3
[58] Field of Search ................ 73/116, 117.3; 123/419, 123/436; 364/431.07, 431.08

[56] References Cited

U.S. PATENT DOCUMENTS

| | | | |
|---|---|---|---|
| 3,908,366 | 9/1975 | Masaki | 73/117.3 |
| 3,972,230 | 8/1976 | Hanson et al. | 73/116 |
| 5,088,318 | 2/1992 | Osawa | 73/117.3 |
| 5,222,392 | 6/1993 | Baba et al. | 73/116 |
| 5,263,364 | 11/1993 | Nakayama et al. | 73/116 |

FOREIGN PATENT DOCUMENTS

3-286166 12/1991 Japan .

OTHER PUBLICATIONS

Plapp et al., "Methods of On-Board Misfire Detection," SAE Special Publications, n. 819, 1990.

*Primary Examiner*—Robert Raevis
*Attorney, Agent, or Firm*—Nikaido, Marmelstein, Murray & Oram

[57] ABSTRACT

A combustion state-detecting system for internal combustion engines has a crank angle sensor which generates a crank angle signal with a predetermined period shorter than a firing period of the spark plug whenever the crankshaft rotates through a predetermined angle. A value of the rotational speed of the engine is detected whenever the crank angle signal is generated. A rate of variation in the detected value of the rotational speed of the engine is calculated over the firing period of the spark plug, and an average value thereof is then calculated. The calculated average value of the variation rate is compared with the calculated variation rate, and a cumulative value of a difference between the calculated variation rate average value and the calculated variation rate is calculated when the calculated variation rate is on the larger deceleration side of the engine rotational speed with respect to the calculated variation rate average value. The calculated difference cumulative value is compared with a predetermined value to determine whether or not the engine is in a degraded combustion state, based on the comparison result.

6 Claims, 11 Drawing Sheets

COMBUSTION STATE-DETECTING SYSTEM FOR INTERNAL COMBUSTION ENGINES

BACKGROUND OF THE INVENTION

1. Field of the Invention

This invention relates to a combustion state-detecting system for detecting a state of combustion (misfiring) in internal combustion engines, based on a variation in the angular velocity of the crankshaft during rotation of the engine in every combustion cycle.

2. Prior Art

Conventionally, a system is known which determines the combustion state of an internal combustion engine, based on a rate of variation in the angular velocity of the crankshaft during rotation of the engine, as proposed, for example, by Japanese Provisional Patent Publication (Kokai) No. 3-286166.

According to the known system, an output from a crank angle sensor is used to detect a rate of variation in the angular velocity of the crankshaft. However, the output of the crank angle sensor always varies due to various factors, such as dimensional errors of the crank angle sensor, dynamic errors of the engine per se, and therefore, the combustion state of the engine cannot be accurately determined.

To overcome this disadvantage, the present assignee has already proposed a method of determining a state of combustion of an internal combustion engine by calculating a rate of variation in the rotational speed of the crankshaft and an average value thereof, and further calculating a cumulative value of the absolute value of the difference between the rate of variation and the average value thereof, followed by comparing the cumulative value with a predetermined value, by Japanese Patent Application No. 4-273632.

However, in the above proposed method, since the rate of variation in the rotational speed of the crankshaft is expressed as a cumulative value of the absolute value of the difference between the rate of variation and the average value thereof, even when the rotational speed turns to an increased side after occurrence of a misfire, the variation in the rotational speed is added to the cumulative value, whereby the cumulative value may exceed the predetermined value. As a result, it is difficult to accurately discriminate the misfiring cylinder.

Further, to discriminate the misfiring cylinder, the use of a complicated algorithm is required, which makes it difficult to promptly discriminate the misfiring cylinder.

SUMMARY OF THE INVENTION

It is an object of the invention to provide a combustion state-detecting system for internal combustion engines, which is capable of detecting a misfire and discriminating a misfiring cylinder in a simple and prompt manner.

To attain the above object, the present invention provides a combustion state-detecting system for an internal combustion engine having at least one spark plug, and a crankshaft, comprising:

crank angle signal-generating means for generating a crank angle signal with a predetermined period shorter than a firing period of the spark plug whenever the crankshaft rotates through a predetermined angle;

engine rotational speed-detecting means for detecting a value of rotational speed of the engine whenever the crank angle signal is generated;

variation rate-calculating means for calculating a rate of variation in the detected value of rotational speed of the engine over the firing period of the spark plug;

variation rate average value-calculating means for calculating an average value of the calculated rate of variation;

difference cumulative value-calculating means for comparing the calculated average value of the rate of variation with the calculated rate of variation, and for calculating a cumulative value of a difference between the calculated average value of the rate of variation and the calculated rate of variation when the calculated rate of variation is on a larger deceleration side of the rotational speed of the engine with respect to the calculated average value of the rate of variation; and combustion state-determining means for comparing the calculated cumulative value of the difference with a predetermined value, and for determining whether the engine is in a degraded state of combustion, based on a result of the comparison of the calculated cumulative value of the difference with the predetermined value.

Preferably, the combustion state-determining means determines that the engine is in the degraded state of combustion when the calculated cumulative value of the difference is larger than the predetermined value.

Also preferably, the rotational speed-detecting means includes first averaging means for continuously averaging values of the rotational speed of the engine over a period of one rotation of the crankshaft, to obtain a first average value, and second averaging means for averaging the first average values over the firing period of the spark plug, to obtain a second average value, the variation rate-calculating means calculating a rate of variation in the second average value.

Further preferably, the combustion state-detecting system includes engine load-detecting means for detecting load on the engine, and wherein the predetermined value is set in accordance with the detected rotational speed and the detected load on the engine.

Further preferably, the combustion state-detecting system includes abnormality-determining means for determining an abnormality in the engine or at least one control system for the engine, based on a result of determination by the combustion state-determining means.

Still further preferably, the engine rotational speed-detecting means detects the rotational speed of the engine, based on time intervals of generation of the crank angle signal.

The above and objects, features, and advantages of the invention will be more apparent from the following detailed description taken in conjunction with the accompanying drawings.

BRIEF DESCRIPTION OF THE DRAWINGS

FIGS. 2(a), 2(b) and 2(c) are flowcharts showing programs (main routines) for determining a state of combustion of the engine, in which:

FIG. 2(a) shows a CRK processing which is executed in synchronism with generation of a crank angle (CRK) signal;

FIG. 2(b) shows a TDC processing which is executed in synchronism with generation of a top dead center (TDC) signal; and FIG. 2(c) shows a #3STG processing which is executed with the same repetition period as the TDC processing;

DETAILED DESCRIPTION

The invention will now be described in detail with reference to the drawings showing an embodiment thereof.

Figure 1:
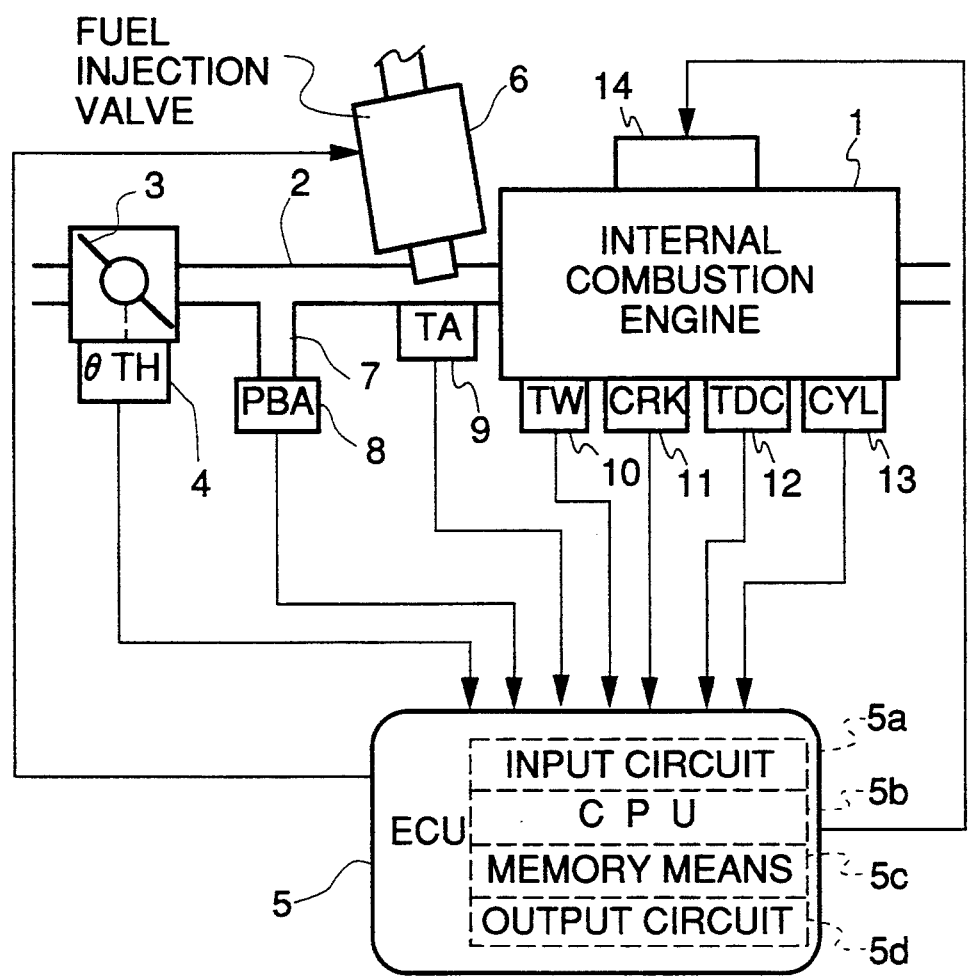
FIG. 1 is a block diagram showing the whole arrangement of an internal combustion engine incorporating a combustion state-detecting system according to an embodiment of the invention.

Referring first to FIG. 1, there is shown the whole arrangement of an internal combustion engine incorporating a combustion state-detecting system according to an embodiment of the invention. In an intake pipe 2 of the engine 1, there is arranged a throttle valve 3, to which is connected a throttle valve opening ($\theta$TH) sensor 4 for generating an electric signal indicative of the sensed throttle valve opening and supplying the same to an electronic control unit (hereinafter referred to as "the ECU") 5.

Fuel injection valves 6 are provided, respectively, for cylinders of the engine and each arranged in the intake pipe 2 at a location between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3 for supplying an electric signal indicative of the sensed absolute pressure to the ECU 5. An intake air temperature (TA) sensor 9 is inserted into the intake pipe 2 at a location downstream of the intake pipe absolute pressure sensor 8 for supplying an electric signal indicative of the sensed intake air temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5.

A cylinder-discriminating sensor (hereinafter referred to as "the CYL sensor") 13, a top dead point (TDC) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "CYL signal pulses") at a predetermined crank angle of a particular cylinder of the engine 1. These sensors 11 to 13 are each formed of a magnetic pickup or a pulser. The TDC sensor 12 generates a TDC signal pulse at a predetermined crank angle before a top dead point (TDC) of each cylinder corresponding to the start of the intake stroke of the cylinder (e.g. whenever the crankshaft rotates through 180 degrees when the engine is of the 4-cylinder type). The CRK sensor 11 generates crank angle pulses (hereinafter referred to as "CRK signal pulses") at predetermined crank angles with a repetition period shorter than the repetition period of TDC signal pulses (e.g. whenever the crankshaft rotates through 30 degrees). The CYL signal pulses, TDC signal pulses, and CRK signal pulses are supplied to the ECU 5.

Arranged in each cylinder of the engine 1 is a spark plug 14, which is electrically connected to the ECU 5.

The ECU 5 comprises an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6 and the spark plugs 14.

The CPU 5b operates in response to signals from the above-mentioned sensors to determine operating conditions in which the engine 1 is operating, and calculates, based upon the determined engine operating conditions, a fuel injection period of each of the fuel injection valves 6 and ignition timing of each of the spark plugs 14, which are energized in synchronism with TDC signal pulses, to thereby generate driving signals for driving the fuel injection valves 6 and the spark plugs 14 via the output circuit 5d.

Figure 2A:
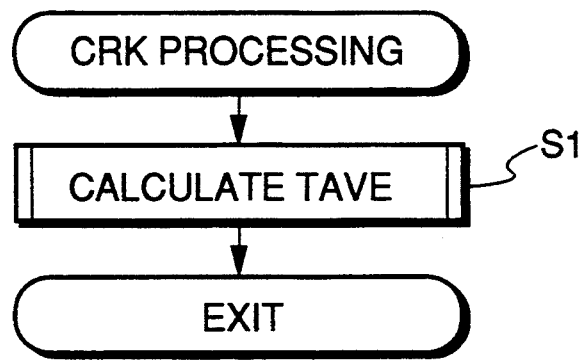
Figure 2B:
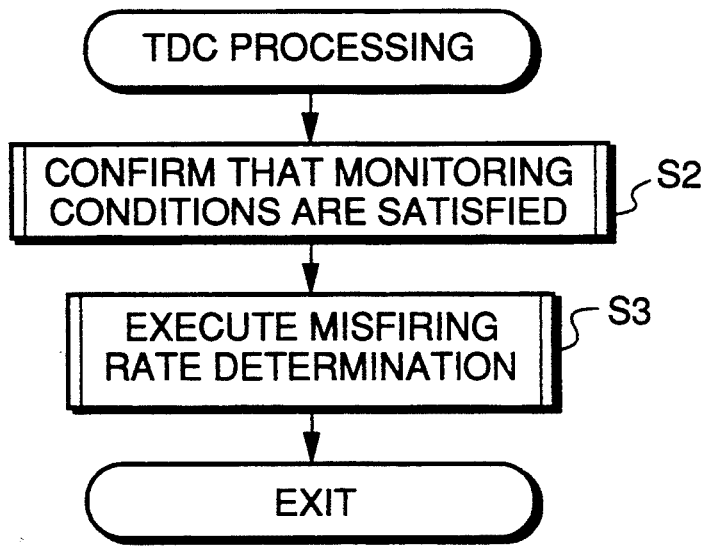
Figure 2C:
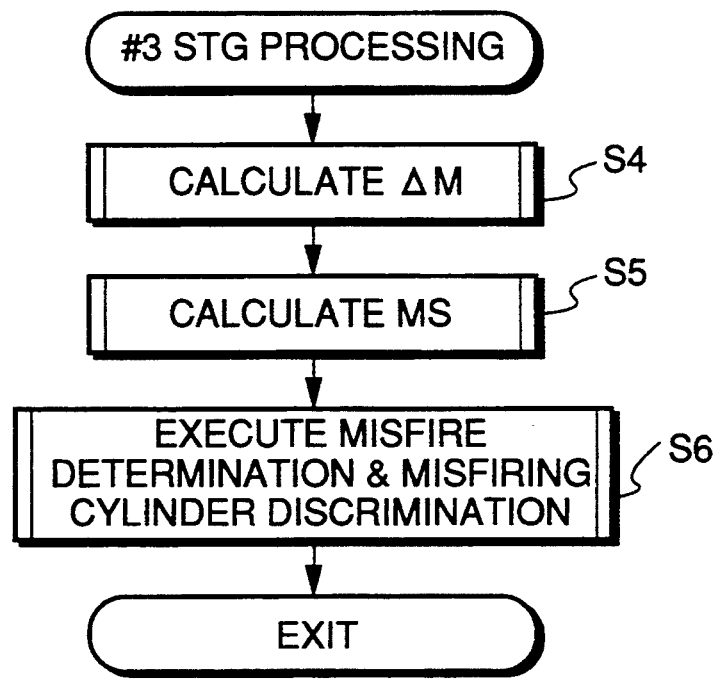

FIGS. 2(a), 2(b) and 2(c) show main routines which are executed by the CPU 5b for determining a state of combustion of the engine 1.

FIG. 2(a) shows a CRK processing carried out in synchronism with generation of CRK signal pulses. At a step S1 of the program, an average value TAVE (hereinafter referred to as "the first average value") of time intervals of occurrence of CRK signal pulses is calculated. The time intervals are proportional to the reciprocal of the engine rotational speed.

FIG. 2(b) shows a TDC processing carried out in synchronism with generation of TDC signal pulses. At a step S2, it is determined whether or not monitoring conditions are satisfied, i.e. whether or not misfiring determination can be carried out, followed by carrying out abnormality determination (misfiring rate determination) at a step S3, based on a number of times of misfire occurrence determined by a #3STG processing of FIG. 2(c).

The monitoring conditions are satisfied, for example, when the engine is in a steady operating condition, while at the same time the engine coolant temperature TW, the intake air temperature TA, the engine rotational speed NE, etc. are all within respective predetermined ranges.

Figure 4:
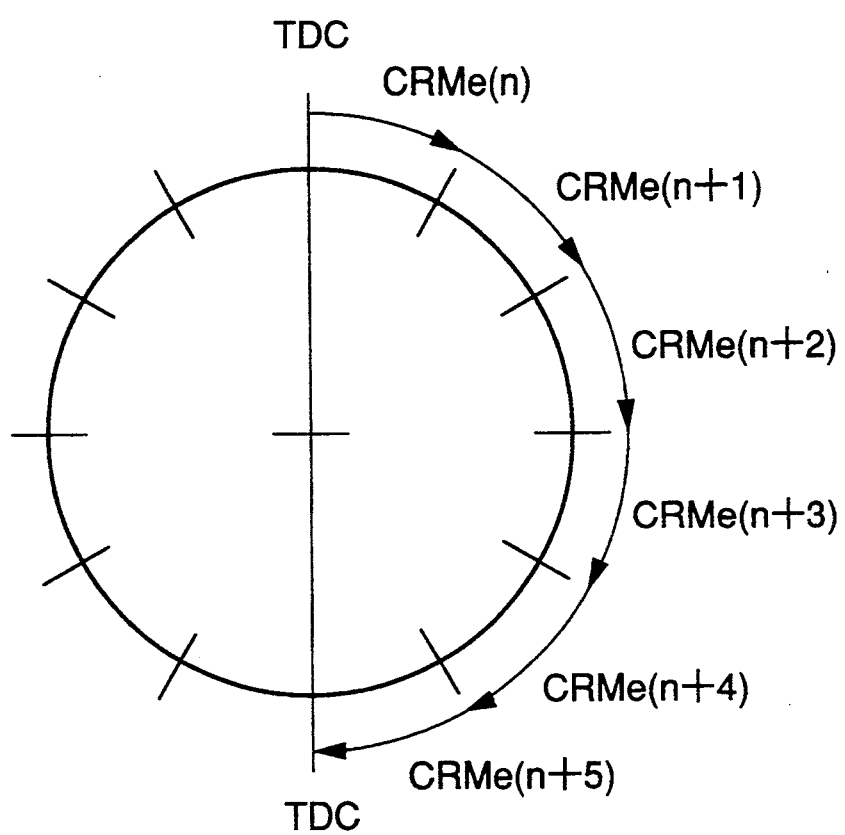
FIG. 4 is a diagram showing the relationship between measuring of parameters indicative of engine rotational speed and the rotational angle of a crankshaft.

FIG. 2(c) shows a processing which is executed with the same repetition period as the TDC processing at a #3 stage #3STG (see FIG. 4). At a step S4, a rate of variation $\Delta M$ in an average value M (hereinafter referred to as "the second average value") of the first average value TAVE calculated in the CRK processing is calculated, and then at a step S5 a cumulative value MS of values of the difference between the rate of variation $\Delta M$ and an average value thereof is calculated, followed by determining at a step S6 whether or not a misfire has occurred in the engine 1 and discriminating which cylinder has misfired, based on the calculated MS value.

Figure 3:
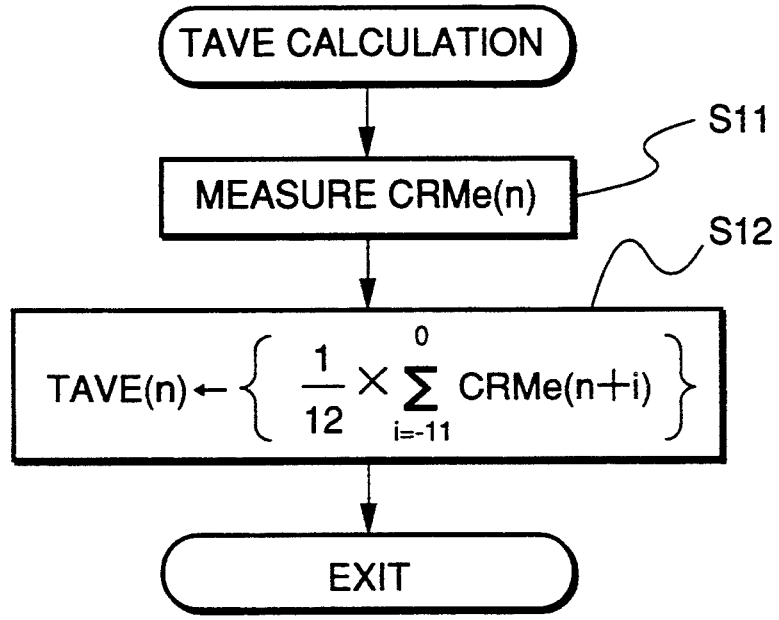
FIG. 3 is a flowchart showing a subroutine for calculating an average value TAVE at a step of the FIG. 2(a) main routine.

FIG. 3 shows a subroutine for calculating the first average value TAVE at the step S1 of the FIG. 2(a) main routine. At a step S11, time intervals CRMe(n) of occurrence of CRK signal pulses are calculated. More specifically, time interval values of CRMe(n), CRMe(n+1), CRMe(n+2) . . . are successively measured whenever the crankshaft rotates through 30 degrees, as shown in FIG. 4.

A time period over which the crankshaft rotates through 180 degrees is segmented every 30 degrees, and the segmented time periods are designated as #0STG to #5STG (#0 stage to #5 stage), respectively.

At a step S12, a first average value TAVE(n) is calculated, which is an average value of 12 CRMe values from a value CRMe(n−11) measured eleven loops before the present loop to a value CRMe(n) in the present loop, by the use of the following equation (1):

$$TAVE(n) = 1/12 \times \sum_{i=-11}^{0} CRMe(n + i) \quad (1)$$

In the present embodiment, since CRK signal pulses are each generated whenever the crankshaft rotates through 30 degrees, the first average value TAVE(n) is an average value obtained over one rotation of the crankshaft. The first average value TAVE(n) obtained by such averaging every period of one rotation of the crankshaft is free of the influence of primary vibration components in engine rotation over a period of one rotation of the engine, i.e. noise components due to dimensional errors (such as manufacturing tolerances and mounting tolerances) of a pulser or a pickup forming the crank angle sensor 11.

The engine rotational speed NE is also calculated based on the TAVE(n) value.

Figure 5:
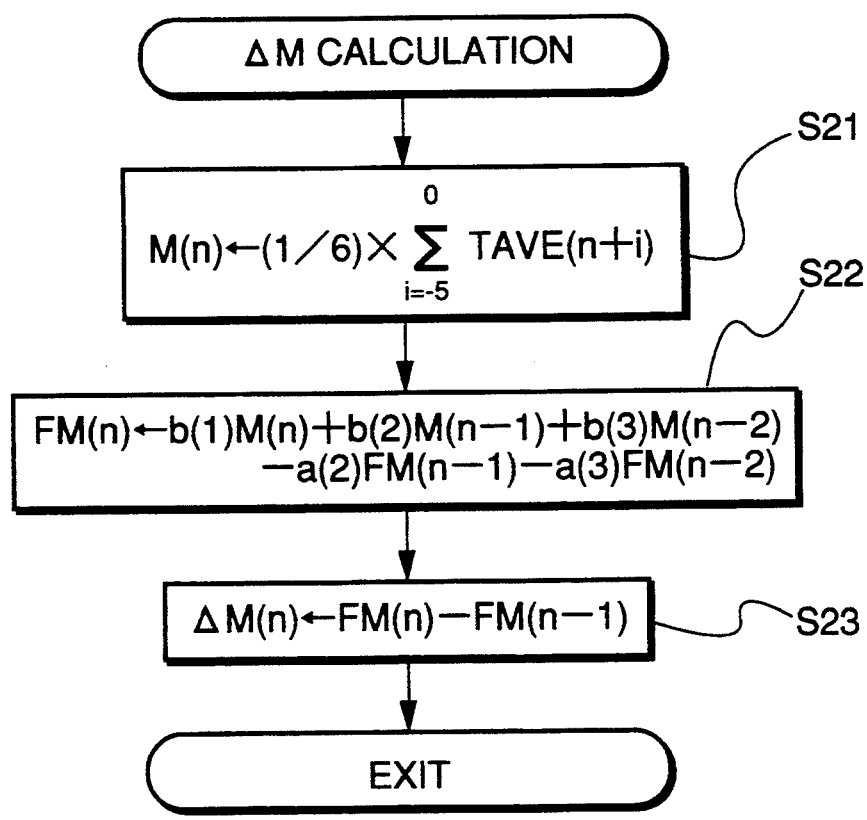
FIG. 5 is a flowchart showing a subroutine for calculating a rate of variation $\Delta M$ at a step of the FIG. 2(c) main routine.

FIG. 5 shows a subroutine for calculating the rate of variation $\Delta M$, which is executed at the step S4 of the FIG. 2(c) main routine.

At a step S21, the second average value M(n) is calculated by averaging 6 TAVE values from a value TAVE(n−5) obtained five loops before to a value TAVE(n) in the present loop, by the use of the following equation (2):

$$M(n) = 1/6 \times \sum_{i=-5}^{0} TAVE(n + i) \quad (2)$$

In the present embodiment, the engine 1 is a 4-cylinder/4-cycle engine, wherein spark ignition is carried out at any one of the cylinders (#1 cylinder to #4 cylinder) whenever the crankshaft rotates through 180 degrees. Therefore, the second average value M(n) is an average value obtained from the first average value TAVE(n) over one firing period. The second average value M(n) obtained by such averaging per ignition cycle is free of secondary vibration components representing a variation in torque of the engine due to combustion, i.e. vibration components in engine rotation over a period of a half rotation of the crankshaft.

At the following step S22, the second average value M(n) thus calculated is subjected to high-pass filtering by the use of the following equation (3), to obtain a high-pass filtered second average value FM(n):

$$FM(n) = b(1) \times M(n) + b(2) \times M(n-1) + b(3) \times M(n-2) - a(2)FM(n-1) - a(3)FM(n-2) \quad (3)$$

where b(1) to b(3), a(2), and a(3) represent filter transmission coefficients, which assume, for example, 0.2096, −0.4192, 0.2096, 0.3557, and 0.1940, respectively. When n in the equation (3) assumes 0 or 1, FM(0) and FM(1) are set to zero, and therefore, the equation (3) is effectively applied when n assumes a value of 2 or more.

The high-pass filtered second average value FM(n) obtained as above is free of frequency components lower than about 10 Hz contained in the M(n) value, to thereby eliminate the adverse effect of vibrations (e.g. vibrations due to torsion of the crankshaft and road surface vibrations transmitted through wheels of a vehicle on which the engine is installed) transmitted from a driving system of the vehicle to the engine.

At a step S23, a rate of variation $\Delta M(n)$ in the high-pass filtered second average value FM(n) is calculated by the use of the following equation (4):

$$\Delta M(n) = FM(n) - FM(n-1) \quad (4)$$

The high-pass filtered second average value FM(n) is inverted in sign from that of the M(n) value when a misfire has occurred in the engine 1. Therefore, when a misfire has occurred in the engine 1, the M(n) value is increased, which in turn causes an increase in the FM(n) value in the negative direction and accordingly an increase in the $\Delta M(n)$ value in the negative direction. An increase in the $\Delta M(n)$ value in the negative direction indicates an increase in deceleration of the engine rotational speed.

Figure 6:
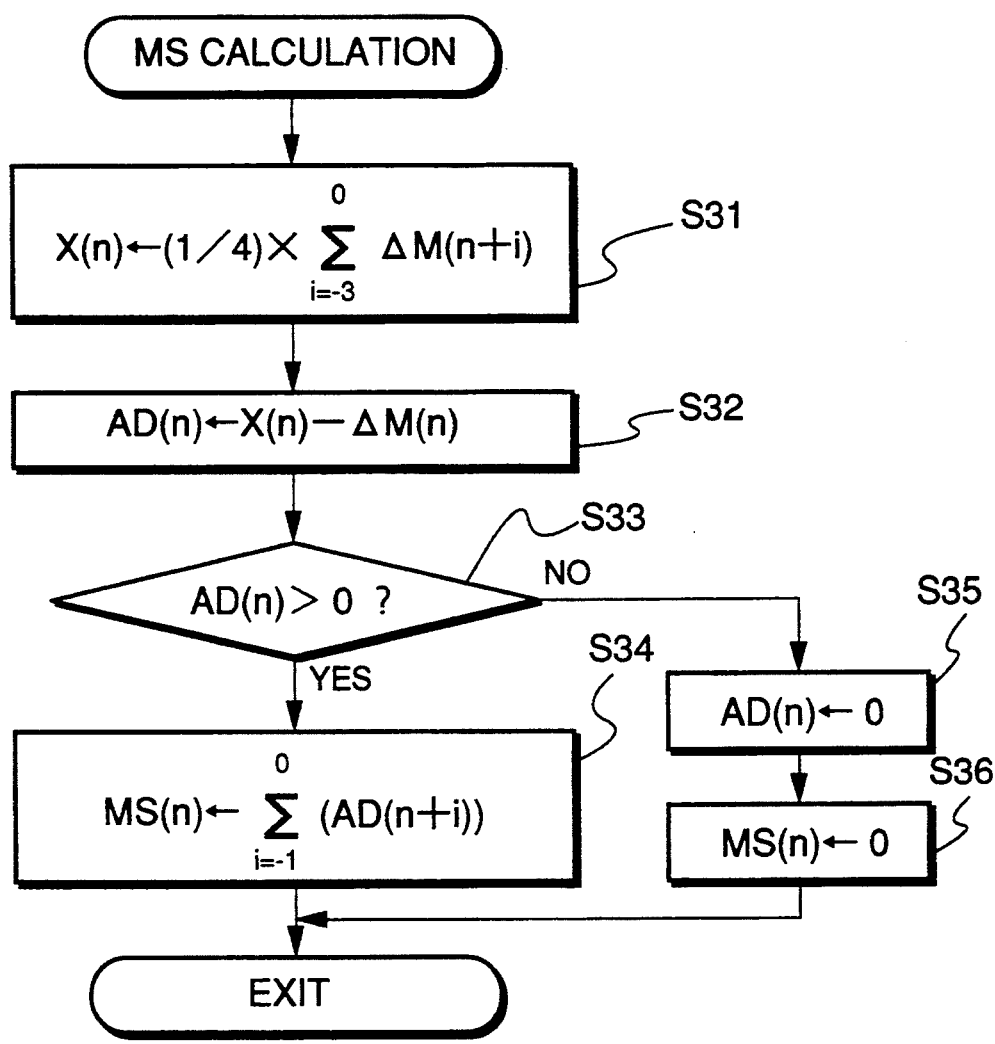
FIG. 6 is a flowchart showing a subroutine for calculating a cumulative value MS at a step of the FIG. 2(c) main routine.

FIG. 6 shows a subroutine for calculating the cumulative value MS at the step S5 of the FIG. 2(c) main routine.

At a step S31, a variation rate average value X(n) is calculated, which is an average value of four $\Delta M$ values from a value $\Delta M(n-3)$ calculated three loops before the present loop to a value $\Delta M(n)$ in the present loop, by the use of the following equation (5):

$$X(n) = 1/4 \times \sum_{i=-3}^{0} \Delta M(n + i) \quad (5)$$

At the following step S32, a difference AD(n) between the variation rate average value X(n) and the rate of variation ΔM(n) is calculated by the use of the following equation (6):

$$AD(n) = X(n) - \Delta M(n) \quad (6)$$

Then, it is determined at a step S33 whether or not the difference AD(n) is larger than a value of 0. If AD(n)≦0 stands, the difference AD(n) is set to 0 at a step S35 and a value MS (N) is set to 0 at a step S36. The value MS(n) is a cumulative value of the differences AD(n).

If the answer to the question of the step S33 is affirmative (YES), i.e. if AD(n)>0, the cumulative value MS(n) is calculated by the use of the following equation (7):

$$MS(n) = \sum_{i=-1}^{0} AD(n+i) \quad (7)$$

According to the program of FIG. 6, if the difference AD(n) is positive, a value AD(n−1) obtained in the last loop is added to a value AD(n) obtained in the present loop to obtain a cumulative value MS(n) thereof, i.e. the sum of the values AD(n−1) and AD(n), whereas if the difference AD(n) is equal to zero or negative, the value MS(n) is set to 0. Accordingly, only when the difference AD(n) is positive, i.e. only when the variation rate average value X(n) is larger than the rate of variation ΔM(n), more specifically, only when the engine rotational speed is in the decreasing direction, the cumulative value MS(n) is calculated.

By using the thus calculated cumulative value MS(n), misfire determination is carried out as described hereinbelow. As a result, the influence of a variation in the engine rotational speed occurring after the engine rotational speed turns to the increasing direction can be eliminated, and therefore, misfire detection and misfiring cylinder discrimination can be easily and promptly carried out.

The time period over which the cumulative value MS(n) is calculated (cumulation period) is set to 360 degrees of the crank angle (2 TDC period). This is because of eliminating the influence in reactive of variation in the angular velocity of the crankshaft due to a misfire.

Figure 7:
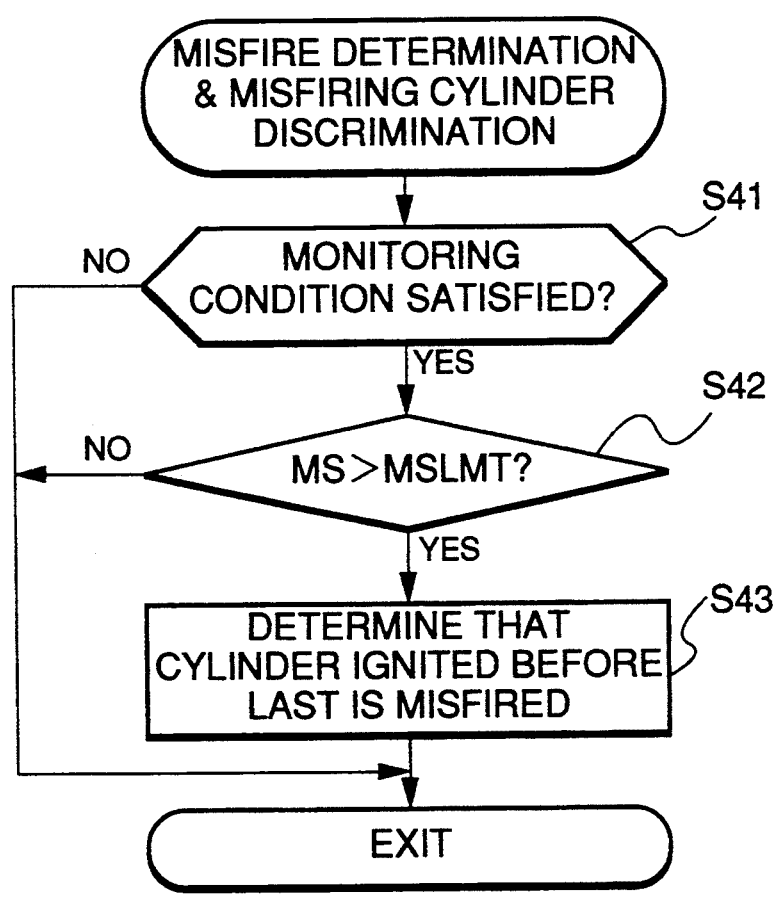
FIG. 7 is a flowchart showing a subroutine for carrying out misfire determination and misfiring cylinder discrimination at a step of the FIG. 2(c) main routine.

FIG. 7 shows a subroutine for carrying out misfire determination and misfiring cylinder discrimination, based on the cumulative value MS calculated as above, which is executed at the step S6 of the FIG. 2(c) main routine.

At a step S41, it is determined whether or not the aforestated monitoring conditions are satisfied, and if the monitoring conditions are not satisfied, the present program is immediately terminated.

Figure 8:
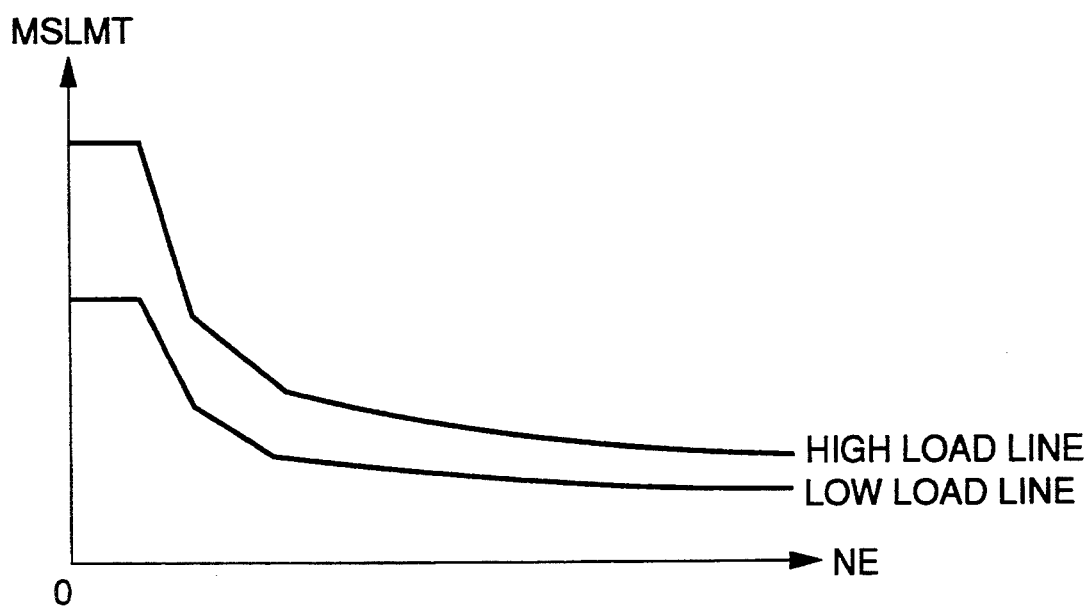
FIG. 8 is a diagram useful in explaining a method of setting a threshold value (MSLMT) for misfire determination.

If the monitoring conditions are satisfied, the program proceeds to a step S42, where it is determined whether or not the cumulative value MS is larger than a misfire-determining threshold value MSLMT. The misfire-determining threshold value MSLMT is read from a map which is set according to the engine rotational speed NE and the engine load (intake pipe absolute value PBA) as shown in FIG. 8. The threshold value MSLMT is set to a smaller value as the engine rotational speed NE increases, and set to a larger value as the engine load increases. The above setting reflects the fact that a combustion period becomes longer as the engine rotational speed decreases, resulting in a larger variation in the engine rotational speed, and the output torque of the engine becomes larger as load on the engine increases, resulting in a larger rate of variation in the torque.

If the answer to the question of the step S42 is negative (NO), i.e. if MS≦MSLMT is satisfied, the program is immediately terminated. If the answer to the question of the step S42 is affirmative (YES), i.e. if MS>MSLMT is satisfied, it is determined at a step S43 that a misfire has occurred in the cylinder where spark ignition took place in the loop before the last loop (two TDC signal pulses before the present loop). That is, as described hereinabove, the cumulative value MS is likely to increase as the deceleration of the engine rotational speed increases. Therefore, according to the present embodiment, when the cumulative value MS exceeds the threshold value MSLMT, it is determined that a misfire has occurred.

The reason why it is determined that a misfire has occurred in the cylinder ignited in the loop before the last loop is that the high-pass filtering causes a delay in obtaining the second average value FM(n). The delay may change depending on the type of high-pass filtering (filtering characteristics), and therefore, the misfiring cylinder discrimination should be carried out in a different manner dependent on the type of high-pass filtering (for example, the cylinder that should be determined to have misfired may be a cylinder ignited TDC signal pulses before the present loop, or the cylinder ignited at the last TDC signal pulse).

Figure 9:
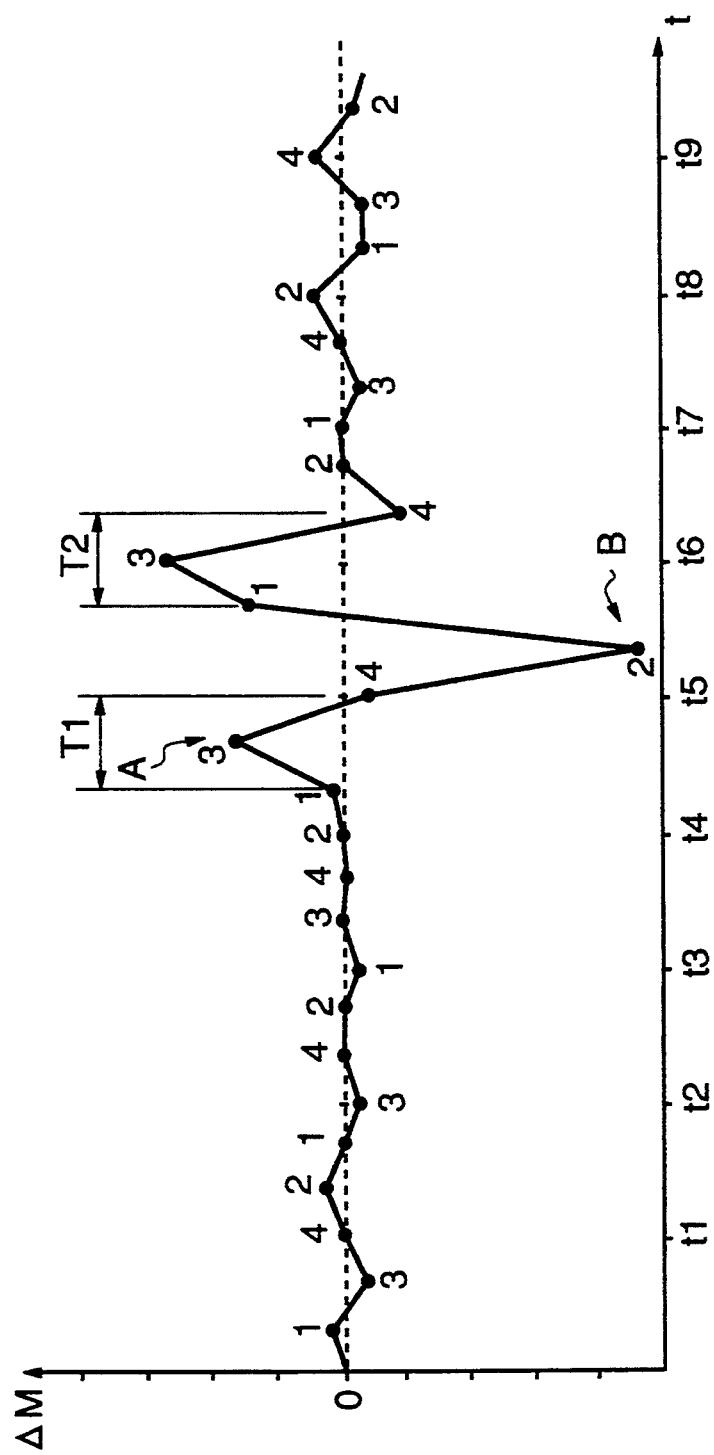
FIG. 9 is a diagram showing a change in a parameter ($\Delta M$) representative of a rate of variation in the engine rotational speed with the lapse of time, in the event of occurrence of a misfire.
Figure 10:
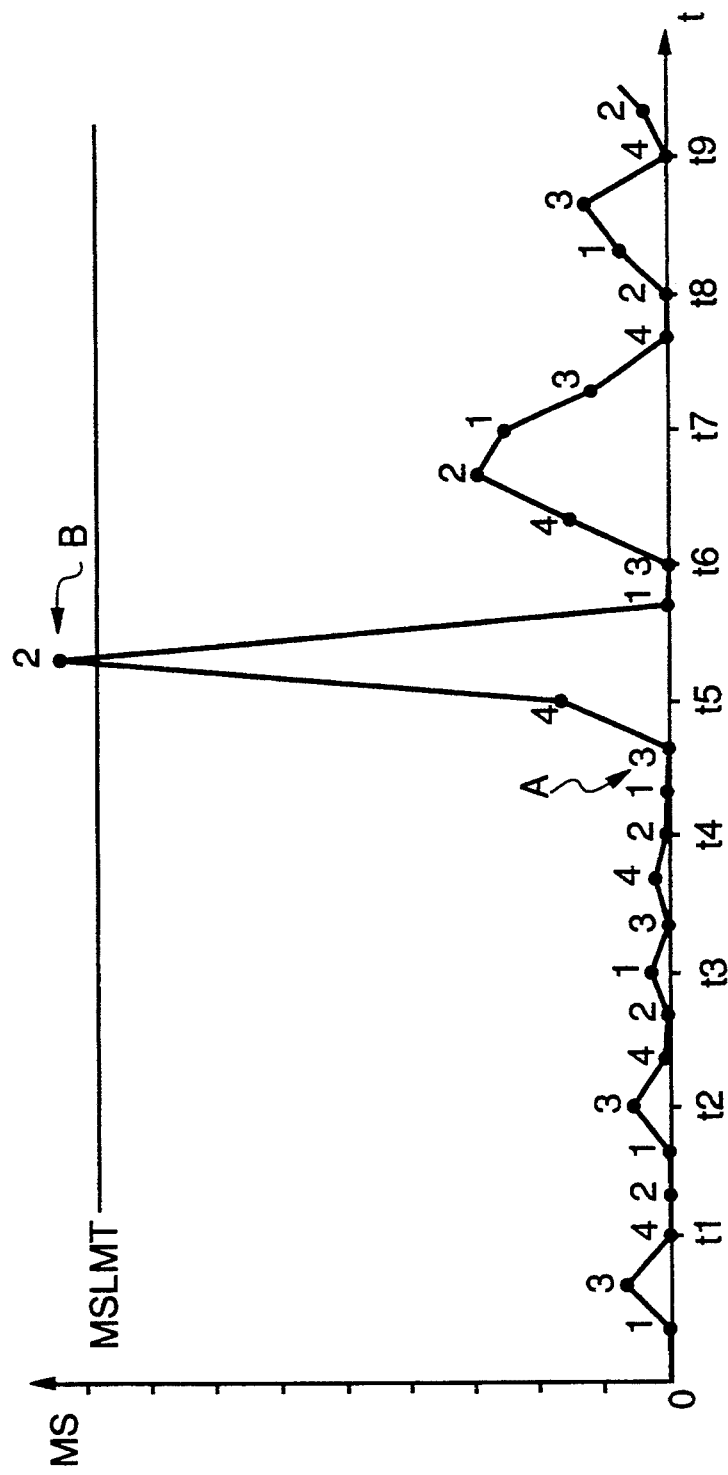
FIG. 10 is a diagram showing a change in a cumulative value (MS) of the difference between a value of the parameter ($\Delta M$) and an average value thereof.

FIG. 9 shows, by way of example, a change in the rate of change ΔM with the lapse of tie in the case where a single misfire has occurred in the #3 cylinder, and FIG. 10 shows a change in the cumulative value MS corresponding to the above change in the rate of change ΔM with the lapse of time. In these graphs, time points t1 to t9 on the abscissas in the two figures correspond to each other, and numerals in the figures indicate numbers allotted to the cylinders where spark ignition took place.

In the illustrated example, as shown in FIG. 10, the cumulative value MS exceeds the threshold value MSLMT when the #2 cylinder indicated by the arrow B is ignited. Therefore, it is determined that a misfire has occurred in the #3 cylinder indicated by the arrow A (cylinder where spark ignition took place two TDC signal pulses before). Further, by comparing FIG. 9 with FIG. 10, it will be found that the value ΔM (at time periods T1 and T2 in FIG. 9) obtained when the engine rotational speed changes in the increasing direction does not contribute to the MS value.

Figure 11:
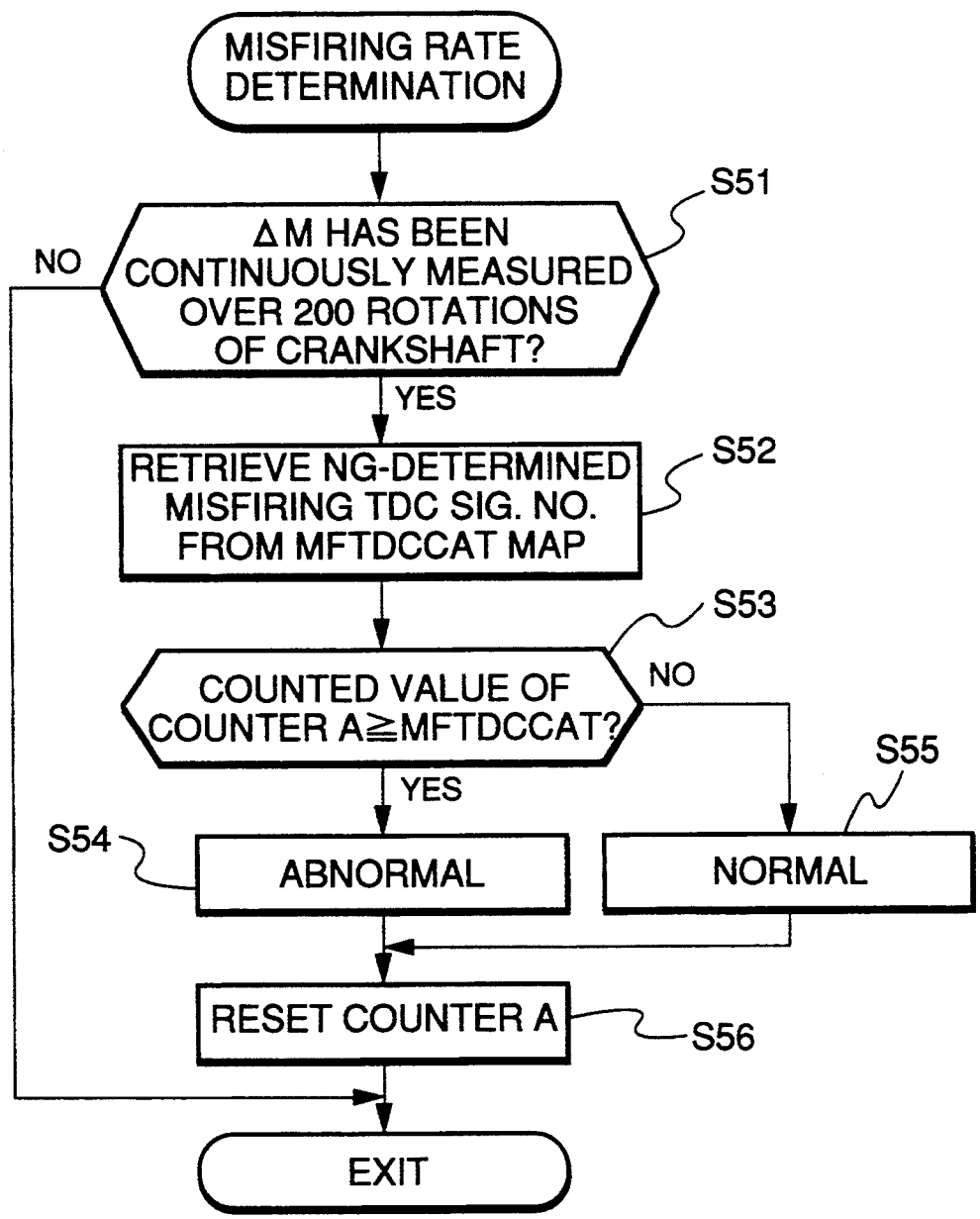
FIG. 11 is a flowchart showing a subroutine for carrying out misfiring rate determination at a step of the FIG. 2(b) main routine.

FIG. 11 shows a subroutine for determining a misfiring rate, which is executed at the step S3 of the FIG. 2(b) main routine.

At a step S51, it is determined whether or not the variation rate (ΔM) has continuously been measured over 200 rotations of the crankshaft after a counter A to be reset at a subsequent step S56, referred to hereinafter, was reset. If the answer to the question of the step S51 is negative (NO), the program is immediately terminated. The counter A counts the number of times of a misfire determination that a misfire occurred in the last cylinder at the step S43 in the FIG. 7 subroutine.

On the other hand, if the variation rate (ΔM) has continuously been measured over 200 rotations of the crankshaft, i.e. if the answer to the question of the step S51 is affirmative (YES), an NG-determined misfiring TDC signal pulse number MFTDCCAT is retrieved from an MFTDCCAT map at a step S52. The NG-determined misfiring TDC signal pulse number MFTDCCAT is a threshold value to be used for a determination at the next step S53. The MFTDCCAT map is set in accordance with the engine rotational speed NE and the intake pipe absolute pressure PBA, such that the MFTDCCAT value is set to a smaller value as the NE value increases or as the PBA value increases.

At the following step S53, it is determined whether or not the count value of the counter A is equal to or more than the threshold value MFTDCCAT. If the answer to the question of the step S53 is affirmative (YES), the program proceeds to a step S54, where it is determined that an abnormality exists. On the other hand, if the answer at the step S53 is negative (NO), it is determined at a step S55 that the engine is in a normal condition. Then, the counter A is reset at the step S56, followed by terminating the present routine.

Thus, when the number of times of the misfire determination exceeds a predetermined value, an abnormality is determined to exist in the engine or a control system therefor such as the ignition system and the fuel supply system.

The misfiring rate determination is not limited to the example shown in FIG. 11, but a method may be employed for use together with the FIG. 11 example, which compares the number of times of misfire occurrence obtained by measuring a variation in the crankshaft rotation over 1000 rotations of the crankshaft with a predetermined value, whereby even a slight degree of abnormality in the system may be detected.

What is claimed is:

1. A combustion state-detecting system for an internal combustion engine having at least one spark plug, and a crankshaft, comprising:

crank angle signal-generating means for generating a crank angle signal with a predetermined period shorter than a firing period of said spark plug whenever said crankshaft rotates through a predetermined angle;

engine rotational speed-detecting means for detecting a value of rotational speed of said engine whenever said crank angle signal is generated;

variation rate-calculating means for calculating a rate of variation in the detected value of rotational speed of said engine over said firing period of said spark plug;

variation rate average value-calculating means for calculating an average value of the calculated rate of variation;

difference cumulative value-calculating means for comparing the calculated average value of said rate of variation with the calculated rate of variation, and for calculating a cumulative value of a difference between the calculated average value of said rate of variation and the calculated rate of variation only when the rotational speed of said engine is in the decreasing direction; and combustion state-determining means for comparing the calculated cumulative value of said difference with a predetermined value, and for determining whether said engine is in a degraded state of combustion, based on a result of said comparison of the calculated cumulative value of said difference with said predetermined value.

2. A combustion state-detecting system as claimed in claim 1, wherein said combustion state-determining means determines that said engine is in said degraded state of combustion when the calculated cumulative value of said difference ms larger than said predetermined value.

3. A combustion state-detecting system as claimed in claim 1, wherein said rotational speed-detecting means includes first averaging means for continuously averaging values of said rotational speed of said engine over a period of one rotation of said crankshaft, to obtain a first average value, and second averaging means for averaging said first average values over said firing period of said spark plug, to obtain a second average value, said variation rate-calculating means calculating a rate of variation in said second average value.

4. A combustion state-detecting system as claimed in claim 1, including engine load-detecting means for detecting load on said engine, and wherein said predetermined value is set in accordance with the detected rotational speed and the detected load on said engine.

5. A combustion state-detecting system as claimed in any of claims 1 to 4, including abnormality-determining means for determining an abnormality in said engine or at least one control system for said engine, based on a result of determination by said combustion state-determining means.

6. A combustion state-detecting system as claimed in any of claims 1 to 4, wherein said engine rotational speed-detecting means detects the rotational speed of said engine, based on time intervals of generation of said crank angle signal.

* * * * *